Patented Feb. 26, 1935

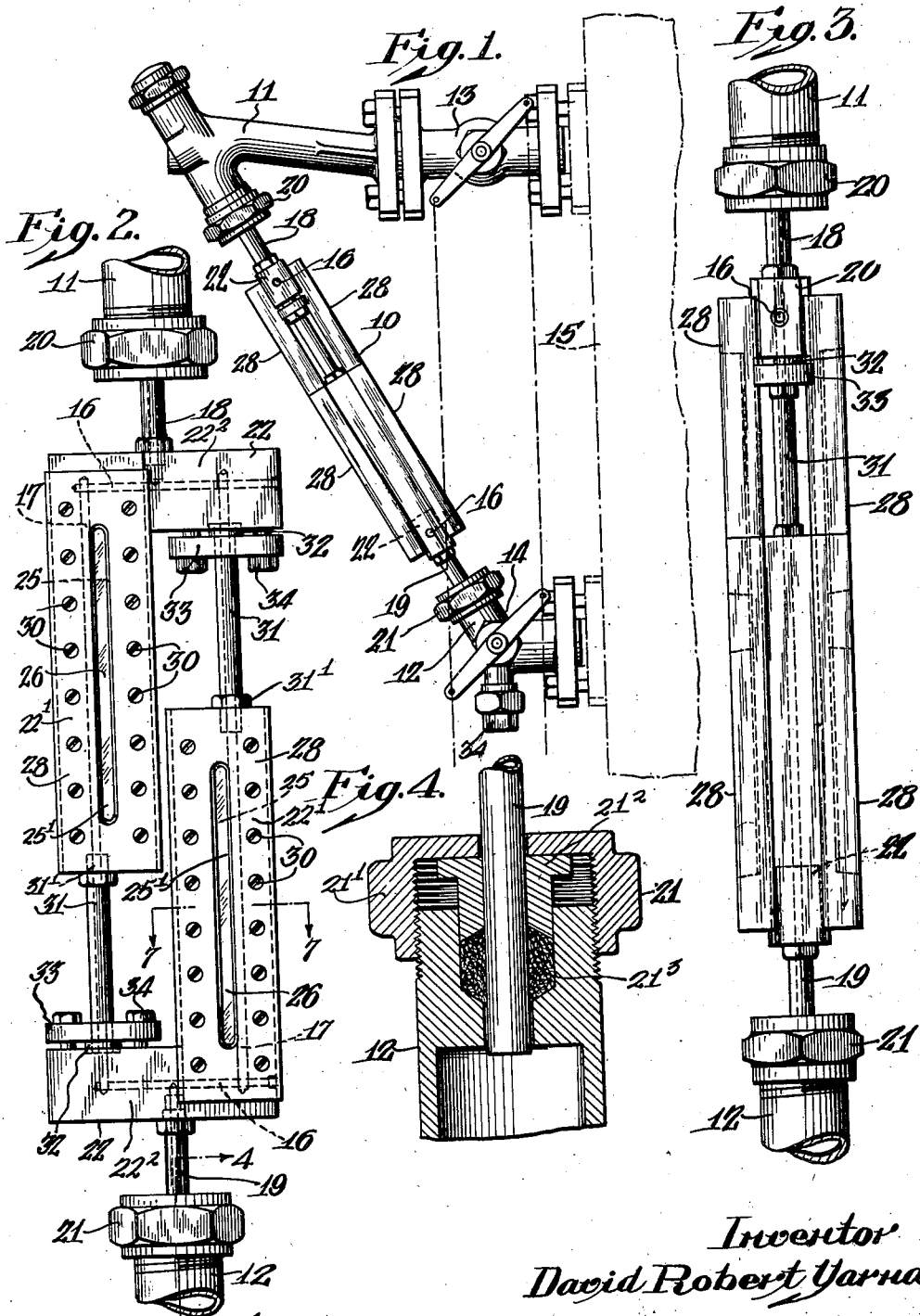

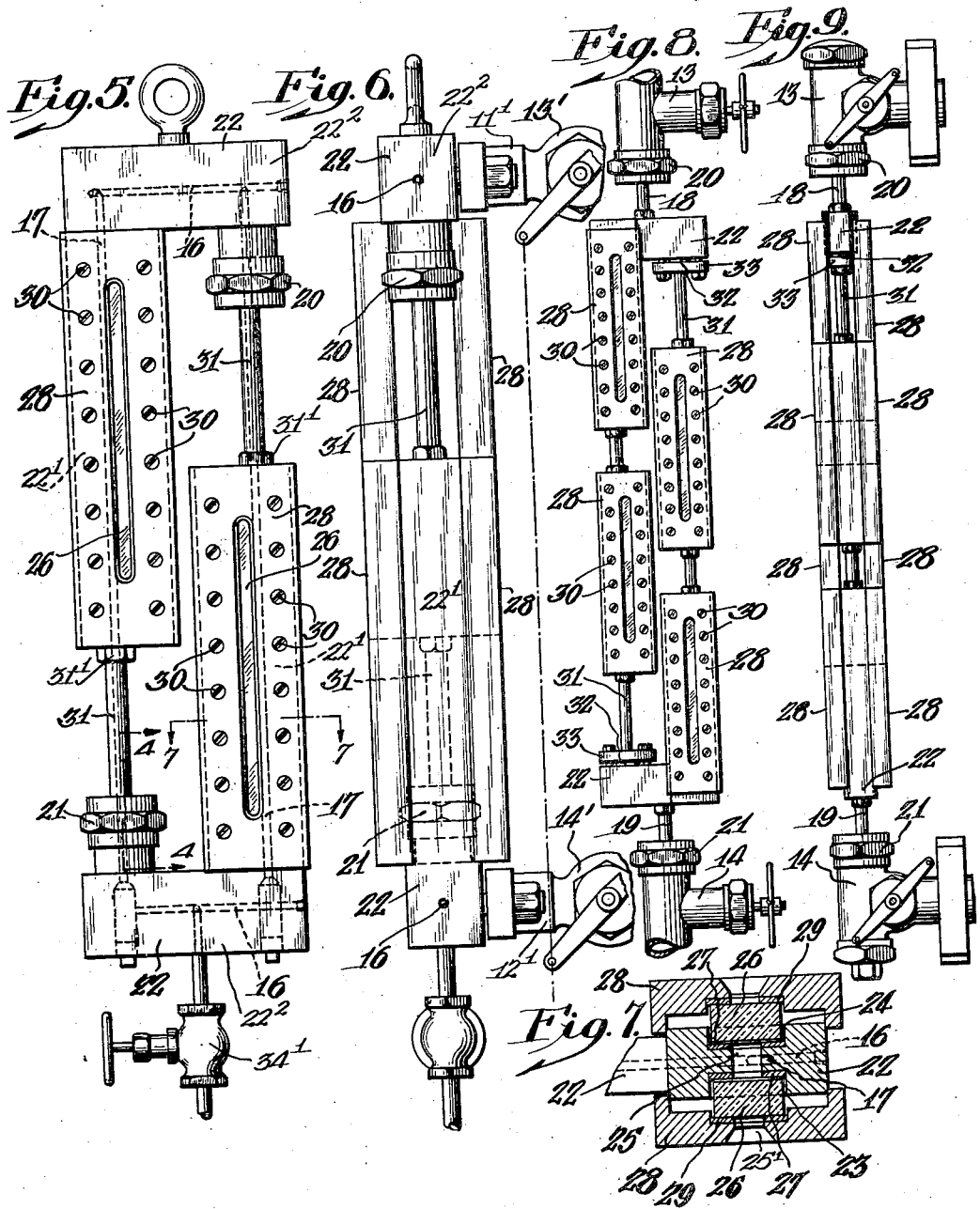

1,992,455

UNITED STATES PATENT OFFICE 1,992,455

LIQUID LEVEL GAUGE

David Robert Yarnall, Philadelphia, Pa., assignor to Yarnall-Waring Company, Philadelphia, Pa., a corporation of Pennsylvania Application March 13, 1933, Serial No. 660,598

5 Claims. (Cl. 73—54)

My invention relates to an indicator for the level of a liquid, and has particular reference to an indicator adapted to use as a water gauge for a high pressure boiler, the device being of that type in which the liquid is displayed in laterally offset vertically overlapping columns and each column lies between flat pieces of glass on opposite sides of a slot in a metal plate.

A purpose of the invention is to provide a novel and effective device of the character indicated that will be adapted to easy and inexpensive manufacture and to easy accommodation to the widely variant needs of service.

A further purpose is to provide a composite gauge with independent parallel columns for substantially the length of the gauge, the columns having common connections at the top and bottom of the device to a boiler or the like and displaying the liquid between glass plates of the upper and lower overlapping portions of the columns.

A further purpose is to increase the effective life of a gauge of the character indicated by relatively isolating the laterally offset vertically overlapping display columns, separating the columns throughout the length of the device so that the condensate entering the device, and normally gradually effective to cloud the glasses and thereby prevent effective displays, will be divided between a plurality of columns instead of all passing through all columns, effectively cutting the clouding actions of the condensate upon the glasses of the individual columns into half or a smaller fraction.

A further purpose is to increase the available length of display for a device of given length by providing a freedom for longitudinal accommodation between the laterally spaced display columns, at portions thereof longitudinally beyond the display glasses.

A further purpose is to make the supporting members of a gauge glass include reversely directed longitudinally hollow metal L members, that are preferably duplicate, the short and long arms of the L's forming respectively the ends and sides of a rectangle, the finished gauge having a continuous longitudinally rectangular passage and making longitudinally overlapping displays along corresponding portions of the long arms of the L members.

Further purposes appear in the specification and in the claims.

I have elected to show a few only of the different forms of my invention, selecting forms however that are practical and effective in operation and which well illustrate the principles involved.

Figure 1 is a side elevation of a gauge, in one of its positions of use, which forms a desirable embodiment of my invention.

Figure 2 is an enlarged front view of the gauge of Figure 1, including a portion only of connector fittings illustrated unbroken in Figure 1.

Figure 3 is a right side elevation of Figure 2.

Figure 4 is an enlarged detail section corresponding equally well to a section upon the line 4—4 of Figure 2 or to a section upon the line 4—4 of Figure 5.

Figure 5 is a view corresponding to Figure 2 but showing a somewhat different form of gauge.

Figure 6 is a right side view of Figure 5.

Figure 7 is a sectional detail corresponding to an enlarged section upon the line 7—7 of Figures 2 and 5.

Figures 8 and 9 are front and side views respectively of a somewhat different form of my invention.

Like numerals refer to like parts in all figures.

Describing in illustration and not in limitation and referring to the drawings:—

Figure 1 illustrates a forwardly inclined gauge 10 that may embody one form of my invention, and that is shown connected at the top and bottom into fittings 11 and 12 that in turn connect through valves 13 and 14 to a high pressure boiler or the like. The detailed construction of fittings 11 and 12 is not important to my invention.

In Figure 2 the gauge proper includes a body having horizontal end passages 16 at the top and bottom and longitudinal passages 17 connected by the end passages 16. The end passages 16 are connected by pipes 18 and 19 respectively to the fittings 11 and 12, with preferably an expansion joint at 20 or/and at 21 between the gauge and one or both of the upper and lower fittings 11 and 12. The expansion joint 21 of Figure 4 has a threaded cap 21', a follower $21^2$ and packing $21^3$.

The body of the gauge is a composite member that comprises reversely directed metal L's, which are preferably duplicate. The short arms and long arms of the L's form respectively the ends and the sides of the gauge, the connecting longitudinal passages 16 and 17 of each L opening into the passages 17 and 16 of the other L when the L's are connected to form one continuous longitudinally rectangular passage.

The L's being preferably alike, a description of one will apply equally to both.

Each L includes a main body 22 that may be suitably a casting, and has a long arm 22' and a short arm 22². The body is bored at 16 and 17 and suitably planed, recessed and slotted at 23, 24 and 25 respectively.

The strips of heavy glass 26, seated upon packing 27 in the recesses 24, are clamped to place at the front and back of the slot by metal covers 28 with suitable packing 29 between the glass and the covers, the covers being slotted at 25' in registry with the slots 25, and being fastened by screws 30 to the body.

Each pipe connection 31, that leads from the end of a long arm 22' of one L member to a short horizontal arm 22² of the other, is principally a fill-in member and may be fastened permanently at one end and removably at the other, the removable fastening being preferably that at the short horizontal arm of the cooperating L member.

One of these joints at the ends of each pipe 31 may be made to accommodate small variations in the vertical spacing between the horizontal arms of the respective L's, such variations being incident to thermal expansions and contractions of members supporting these end portions of the gauge.

Each pipe 31 may thread into the end of the long arm 22' of one L at 31' and carry at its other end a permanent collar 32 to seat in a recess in the lateral arm 22² of the cooperating L, where it may be clamped to place rigidly by a loose flange 33 and bolts 34.

The L members shown in Figure 2 are longitudinally fixed, one with respect to the other, accommodation for relative expansion and contraction of the fittings 11 and 12 being taken care of at one or both of the pipe extensions 18 or 19, as at one or both of the connections 20 and 21, these connections being suitably packing glands as illustrated in Figure 4.

When the gauge is to be mounted as an inclined gauge as in Figure 1, for reading from below, it will usually be preferable to have the cooperating L members rigidly connected as in Figure 2.

With this type of mounting there may be frequently considerable relative movements between the fittings 11 and 12 incident to variations in the quantity of water in the boiler and also variations in the boiler pressure, these conditions affecting the relative angular spread of the fittings 11 and 12 that inwardly fasten to the boiler and outwardly support the upper and lower ends respectively of the gauge.

In this type of gauge, the desired length of the gauge is usually considerably less than the spacing between the fittings 11 and 12, and there is then no need for longitudinal accommodation between the cooperating L members carrying the respective display portions of the gauge.

In many cases, however, the gauge will be mounted vertically to be read at or near eye level (Figures 5 and 6), the connections 11' and 12' to the boiler being then substantially horizontal and extending horizontally from the back of the horizontal portions of the L's.

As before, the fittings that receive the upper and lower ends of the gauge have relative movements which I accommodate by permitting the L members that together comprise my gauge to have longitudinal freedom, securing this freedom by a stuffing box connection between the adjoining ends of the L's, at one end or the other of each of the pipes 31.

In Figure 5 I show the stuffing box connections 20 and 21 adjacent the short horizontal arms of the L's rather than adjacent the long arms thereof.

An important advantage of my construction is that the same L members may be used equally well whether the gauge is to be used inclined as illustrated in Figure 1, or vertical as illustrated in Figures 5 and 6.

I show minor variations in the constructions of the L members of Figures 2 and 5, such as the arrangement and plugging of the drill holes, the use of a drain plug 34 in Figure 1 instead of a drain valve 34' in Figure 5, etc., but these variations are not essential. Either construction is suited to use whether the gauge is to be vertical or inclined, except only that when the gauge is to be vertical with relatively heavy horizontal connections to the boiler extending horizontally from the short arms of the respective L's, I prefer to have the L members accommodate relative vertical movements of the outer ends of the boiler connections, these ends carrying the upper and lower ends of the gauge, and this novel feature is an important advantage of my device.

In the forms of Figures 2 to 6, each L member includes a single display section. I may, however, provide either or both of the L members with either one or a plurality of display sections in order to secure greater length of display than is feasible with a single display section.

I illustrate this in Figure 8 where I have shown each L member with a long arm made up of more than one display section.

The display sections on opposite sides of the gauge should vertically overlap in order that the level of the column may be read on at least one side of the gauge whatever the height of the column within the range of the gauge.

The structure illustrated in Figure 8 may or may not include stuffing box connections between the L members that together make up the gauge. As illustrated, the stuffing box connection for accommodation of the thermal changes in positions of the supporting fittings is in alinement with and beyond the gauge at one or other of these fittings, as at 20 or 21.

It will be seen that condensate entering the gauge at the top divides along the passage 16 between the two columns 17, and as a result only about half as much of this condensate reaches each display glass as would be the case if all of the condensate went through the two display columns in series. If it be desired to further reduce the amount of condensate passing through each column 17, more than two columns may be connected in parallel.

The life of a gauge of the character indicated is frequently determined by the gradual clouding of the glass incident to reactive conditions inside the gauge at the surface of the glass and to erosion of the glass.

This clouding is to a considerable extent due to an unavoidable alternate condensation and evaporation at and above the water level in the gauge, due to the variant steam pressures, each period of evaporation due to a temporary fall in steam pressure drying the wetted glass and leaving a usually minute residue upon the surface of the wetted glass dried by the evaporation. This residue may or may not wholly dissolve or be wholly washed away when the gauge water next rises in the glass or when the steam pressure rises forming condensate to again wet the glass and wash down the residue into the water.

When condensate forms, as for example due to increase in steam pressure, there is a drainage of condensate above the gauge glasses which tends to cloud the glasses, and this influence is cut in half when the drainage is divided as is the case with my two column type of gauge, another advantage of my construction. The offsetting of the column 17 with respect to the space at 25 between the gauge glasses (see Figure 7) also helps to prevent drainage along the faces of the gauge glasses.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. A gauge having a generally rectangular passage for connection at the end portions thereof to high and low portions of the vessel whose liquid level is to be indicated, said gauge including reversely directed L-shaped members of generally rectangular sections, with the long arms relatively parallel, longitudinally overlapping and outwardly directed to the sides of the short arms toward the outer ends thereof, nipples extending the effective lengths of the long arms of the L-shaped members, and union connections between the nipples and the short arms of the L-shaped members toward the outer ends thereof, the L-shaped members having vertically overlapping through slots into the said passage along intermediate portions of the long arms, display glasses closing the slots along their opposite sides, cover plates having display slots registering with the display portions of the glasses and means clamping the cover plates to opposite faces of the L-shaped members.

2. The structure of claim 1 in which the rectangular passage includes relatively perpendicular bores in the long and short arms of the L-shaped members, and the through slots of the long arms are at their axes laterally offset from the bores and laterally connect therewith along the adjoining sides of the slots and bores.

3. In a liquid level gauge, a pair of identical gauge portions each comprising an integral L-shaped member slotted longitudinally of the side-portion of the L and provided with gauge glasses to enclose the slots and having passages longitudinally of the end portions of the L communicating with the slots, the slot of one L-shaped member extending below that of the other L-shaped member and the slot of the other L-shaped member extending above that of the first L-shaped member, the water level in both slots being readable from one position, the L-shaped members being inverted with respect to one another and the interior of the side-portion of each L-shaped member being connected to the interior of the end-portion of the other L-shaped member.

4. In a liquid level gauge, two gauge portions each comprising an integral L-shaped member slotted longitudinally of the side portion of the L, each side portion being bored to one side of and parallel with the slot, the bores laterally communicating with the slots, gauge glasses to close the slots, each L-shaped member having passages longitudinally of the end portions of the L communicating with the bores of the side portions, the slots of the respective gauge portions indicating respectively higher and lower liquid levels and the gauge portions being connected at each extremity to form a closed passage which is in communication at the top and bottom with the vessel whose liquid level is to be indicated.

5. In a liquid level gauge, a pair of identical gauge portions each comprising an L-shaped member slotted longitudinally of its long side portion and bored longitudinally of its shorter end portion, the slots and bores being in communication, gauge glasses respectively closing the front and rear openings of the slots, cover plates holding the glasses in position, nipples extending from the extremity of each long side portion and expansion joints, one on each end portion, engaging the nipples of the opposite L-shaped member, whereby the L-shaped members are permitted to move with respect to one another with change of temperature.

DAVID ROBERT YARNALL.